United States Patent
Bell et al.

(10) Patent No.: US 8,696,268 B2
(45) Date of Patent: Apr. 15, 2014

(54) HOLE SAW AND GUIDE

(75) Inventors: Grant John Bell, Davie, FL (US); James Watson, Deluth, GA (US)

(73) Assignee: Office Depot, Inc., Boca Raton, FL (US)

( * ) Notice: Subject to any disclaimer, the term of this patent is extended or adjusted under 35 U.S.C. 154(b) by 193 days.

(21) Appl. No.: 13/371,929

(22) Filed: Feb. 13, 2012

(65) Prior Publication Data
US 2013/0209187 A1 Aug. 15, 2013

(51) Int. Cl.
*B23B 51/04* (2006.01)

(52) U.S. Cl.
USPC .......................... 408/80; 408/115 R; 408/204

(58) Field of Classification Search
USPC ................ 408/72 B, 72 R, 79, 80, 81, 82, 83, 408/115 R, 204, 241 B
See application file for complete search history.

(56) References Cited

U.S. PATENT DOCUMENTS 2,725,766 A * 12/1955 Van Heukelom ............... 408/81
4,579,486 A *  4/1986 Damico ........................ 408/204
6,305,885 B1 * 10/2001 Linthicum .................... 408/1 R
7,513,718 B1 *  4/2009 Arnold ......................... 408/1 R
2010/0284754 A1 * 11/2010 Eck ................................ 408/80

FOREIGN PATENT DOCUMENTS

FR          2783733 A1 *  3/2000  ............. B23B 31/40

* cited by examiner

*Primary Examiner* — Daniel Howell
*Assistant Examiner* — Michael Vitale
(74) *Attorney, Agent, or Firm* — Greenberg Traurig, LLP

(57) ABSTRACT

An apparatus for enlarging an existing hole in an object includes a separate hole saw with a center pilot shaft. A guide tube with a disk attached at one end inserts into the preexisting hole in the object and receives a bridging web with a plurality of tapered radial arms cumulatively forming a cone shape on the other end. The space between the bridging web and the disk is reduced by a threaded fitting to clamp the guide tube on the object within the existing hole. When the cone-shaped web wedges into the pre-existing hole, the guide tube is moved toward the axis of the pre-existing hole. The bore of the guide tube slideably receives the pilot member to guide the hole saw to rotate coaxially relative to the bore when cutting the second hole. A flat web may be used for non-coaxial cutting.

15 Claims, 2 Drawing Sheets

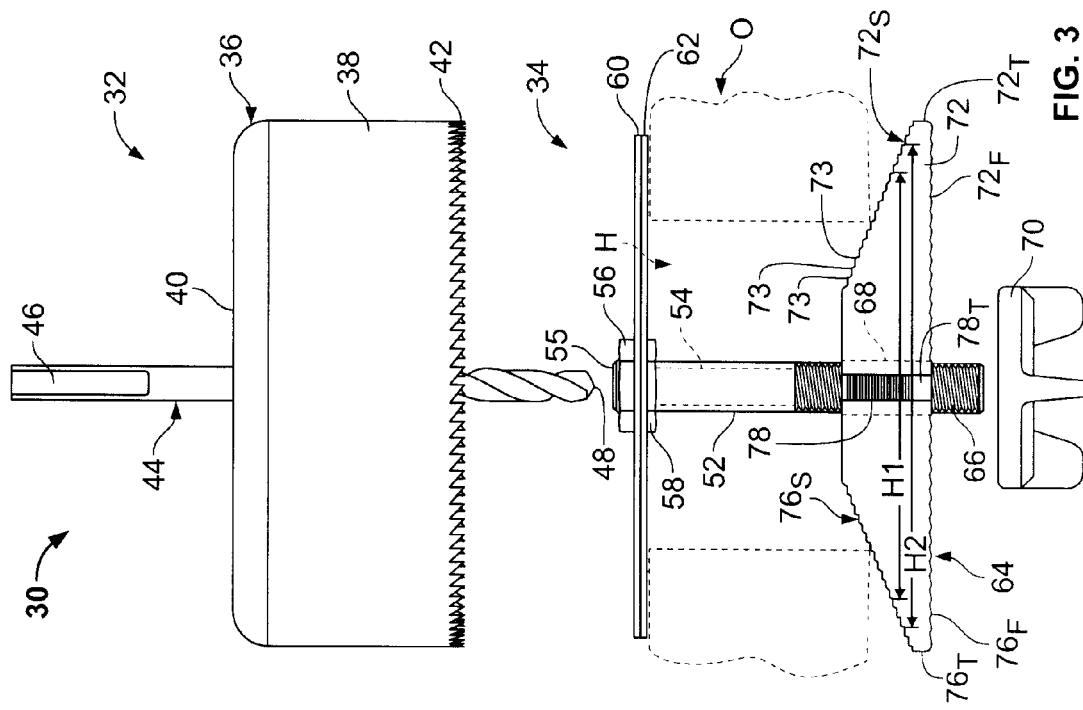
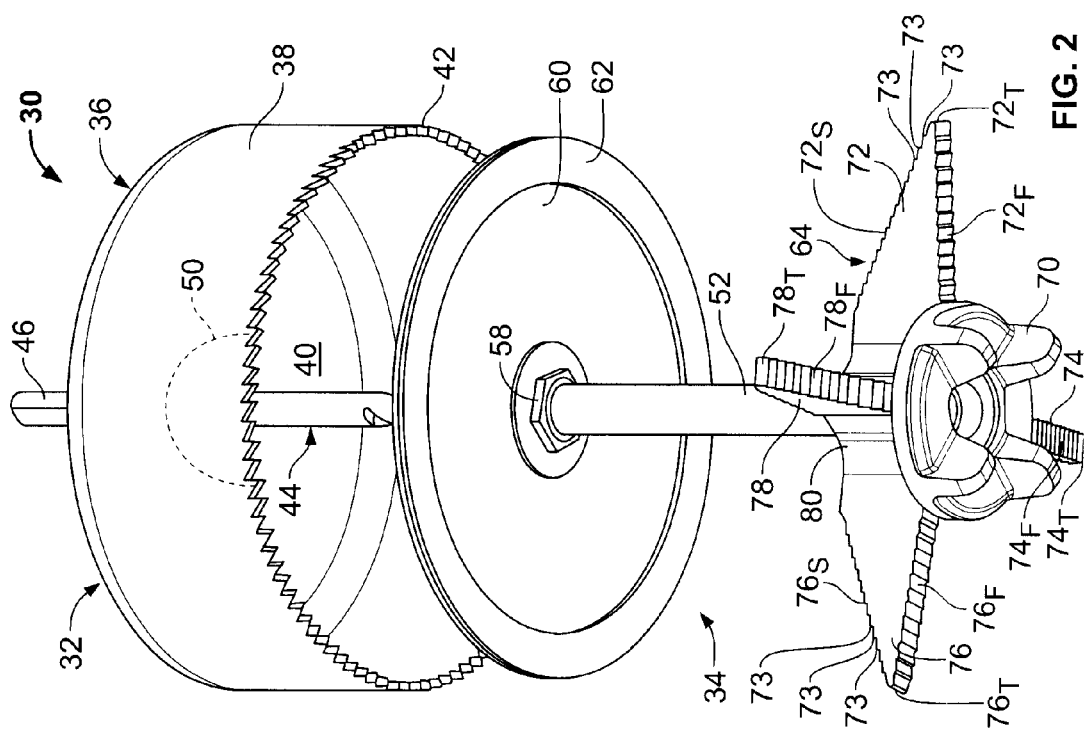

HOLE SAW AND GUIDE

FIELD

The present invention relates to hole saws and more particularly to hole saws having a central pilot bit and an outer cutting element, such as a saw, for cutting a hole.

BACKGROUND

Hole saws with a central pilot bit and an outer concentric cutting element, such as a cylindrical saw or a plurality of cutting blades or gouges are known. In using such hole saws, the pilot bit drills into the material into which a hole is to be cut prior to the engagement of the outer cutting element, e.g., a cylindrical saw, with the material. When the pilot bit drills into the material making a drilled hole, the interaction between the pilot bit and the drilled hole establishes a center of rotation for the cutting element, assisting in holding the cutting element on this center of rotation as the cutting element is turned by a drill and cuts through the material to make a larger hole. This type of saw is typically used for cutting holes in a material which is without pre-existing holes.

SUMMARY

The disclosed subject matter relates to a guide for a hole saw having a pilot member and a cutting member for cutting a second hole in an object having a pre-existing hole, the second hole at least partially overlapping the pre-existing hole. The guide has a guide member with a bore therein, the guide member capable of being positioned in the pre-existing hole and held in the pre-existing hole by at least a first support member attached to the guide member, the bore adapted to slideably receive the pilot member to guide the hole saw to rotate coaxially relative to the bore when cutting the second hole.

In an another approach, the first support member has a component of extension perpendicular to the axis of the bore of the guide member.

In another approach, the guide has a second support member having a component of extension perpendicular to the axis of the bore of the guide member, removably attachable to the guide member.

In another approach, the first and second support members are capable of at least partially bridging the pre-existing hole when the guide member is positioned in the pre-existing hole with the first and second support members attached.

In another approach, the second support member has a plurality of radial arms extending from a hub and the guide member is attached to the second support member proximate the hub.

In another approach, the hub has a first side and a second side, the first side disposed towards one end of the guide member and the second side disposed toward the other end of the guide member when attached thereto, a diameter of the hub being less than a diameter of the pre-existing hole, the radial arms tapering in thickness in a direction parallel to the direction of extension of the hub from the first side to the second side and having a greater thickness proximate the hub and a lesser thickness distal to the hub.

In another approach, at least one of the first support member and the second support member is held in association with the guide member by an adjustable fastener that is adapted to selectively move one of the first and second support members to within a selected proximity of the other.

In another approach, the tapering radial arms are capable of guiding the hub of the second support member toward a position proximate an axis of the pre-existing hole when the adjustable fastener moves the first and second support members closer together and the tapering radial arms contact the object proximate the pre-existing hole.

In another approach, the tapering radial arms define sloped surfaces which cumulatively approximate a portion of a cone adapted to be selectively pointed toward the first support member, the cone progressively wedging into the pre-existing hole as the adjustable fastener urges the first and second support members closer together.

In another approach, the tapering radial arms each have a plurality of steps on the sloped surfaces thereof defining a set of steps on each of the plurality of tapering radial arms.

In another approach, the plurality of tapering radial arms are symmetrical about an axis through the hub, the set of steps on each of the plurality of tapering arms being approximately identical.

In another approach, the steps approximate a plurality of concentric ledges of different radii.

In another approach, the steps function as gripping teeth that bite into the object when the adjustable fastener is tightened.

In another approach, the guide member has a threaded end, the threaded end extending through an aperture in the hub, the fastener being a nut that engages the threaded end and the first and second support members adapted to clamp the object there between when the fastener is tightened.

In another approach, a resilient member is positioned adjacent to the first support member and between the first and second support members.

In another approach, the first support is a disk attached to the guide member proximate one end and the guide member is tubular.

In another approach, the second support member has four radial arms symmetrically disposed about an axis through the hub, the set of steps on each of the plurality of tapering arms being approximately identical.

The present disclosure also relates to a hole cutting assembly for cutting a second hole in an object having a pre-existing hole, the second hole at least partially overlapping the pre-existing hole, the assembly including a hole saw having a pilot member and a cutting member, a guide tube with a bore therein and being threaded at at least one end. A first support member in the form of a disk is attached to the guide tube proximate one end at an approximately perpendicular relative orientation. A second support member having a hub and a plurality of radial arms extending from the hub is attached to the guide tube proximate the hub. The hub has a first side and a second side and an axial aperture running from the first side to the second side, with the axial aperture receiving the guide tube. The first side of the hub is disposed towards one end of the guide tube and the second side is disposed toward the other end of the guide tube when the guide tube is extended there through, the radial arms tapering in thickness in a direction parallel to the direction of extension of the hub from the first side to the second side and having a greater thickness proximate the hub and a lesser thickness distal to the hub. A threaded fastener is receivable on the threaded end of the guide tube to retain the second support member on the guide tube and to control the position of the second support member on the guide tube relative to the first support member. The first support member is positionable on one side of the object with the guide tube attached and extending through the pre-existing hole, with the second support member being attached to the guide tube by the threaded fastener on the other side of the object. The tapering radial arms define sloped surfaces which cumulatively approximate a portion of a virtual cone, such that when the guide tube is positioned in the pre-existing hole with the virtual cone pointed toward the first support member, the virtual cone progressively wedges into the pre-existing hole as the adjustable fastener urges the first and second support members closer together, moving the guide tube toward the axis of the pre-existing hole and holding the guide tube at a given position relative to the axis of the pre-existing hole. The bore of the guide tube is adapted to slideably receive the pilot member to guide the hole saw to rotate coaxially relative to the bore when cutting the second hole.

In another approach, tapering radial arms of the guide each have a plurality of steps on the sloped surfaces thereof capable of functioning as gripping teeth that bite into the object when the adjustable fastener is tightened.

In another approach, the second support member has four radial arms symmetrically disposed about an axis through the hub.

BRIEF DESCRIPTION OF THE DRAWINGS

For a more complete understanding of the present invention, reference is made to the following detailed description of exemplary embodiments considered in conjunction with the accompanying drawings.

FIG. 2 is perspective view of a hole saw and guide assembly.

FIG. 3 is a side view of the hole saw and guide assembly of FIG. 2.

DETAILED DESCRIPTION OF EXEMPLARY EMBODIMENTS

Figure 1:
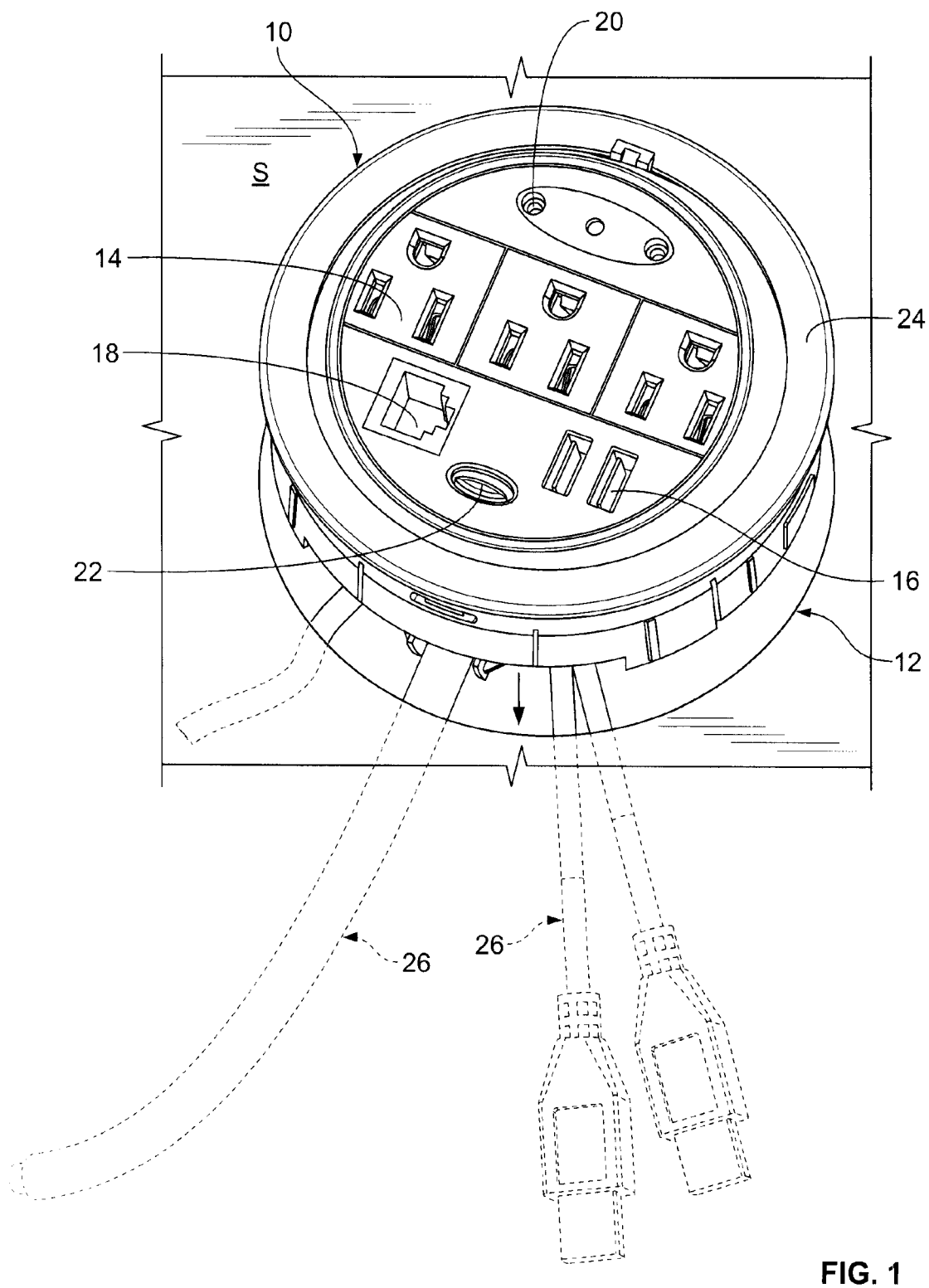
FIG. 1 is an exploded view of a power hub installed in a solid surface, such as a desk top in accordance with an embodiment of the present disclosure.

FIG. 1 shows an electrical power and connector hub 10 which is receivable in a hole 12 formed in surface S, e.g., of a desk or table. The hub 10 is provided with one or more sockets, e.g., three prong electrical outlets 14, USB sockets 16, phone jack(s) 18, etc. The hub 10 may also be provided with LEDS 20 to indicate power is present at the hub, circuit breaker reset button(s) 22 and other electrical power and data connectors, controls and status indicators. The hub 10 inserts into the hole 12 such that the hub 10 is approximately flush with the surface S, a peripheral lip 24 covering the outer edge of the hole 12. Electric cords 26 extend from the hub 10 beneath the surface S. It is known to provide holes in desks and tables to allow the passage of cords and to position electric devices within the holes. Frequently, desks and tables are predrilled and blocked with a removable grommet and or a sleeve to selectively accommodate various devices. The predrilled holes do not, however, necessarily match the size of a given electrical fitting, such as hub 10, which may be, e.g., 3.5 or 4.0 inches in diameter, whereas the predrilled hole may be, e.g., 2.0 or 2.5 inches in diameter. Stated more generally, it is possible for there to be a size mismatch between the electrical apparatus installed into the desk or table and the predrilled hole. In the event that it is desirable to enlarge a pre-existing hole with a larger sized hole saw, it is sometimes difficult to maintain the position of the hole saw relative to the existing hole if the guide bit is significantly smaller than the pre-existing hole and therefore does not provide a guiding function to hold the cutting element on a center of rotation coaxial with the existing pre-drilled hole. While this situation exists when enlarging a pre-existing hole in a desk or a table to accommodate an electrical fitting, the situation exists in any case wherein a pre-existing hole needs to be enlarged by a larger hole saw, e.g., in enlarging a hole for a lock set in a door, or enlarging a passageway through a floor for water pipes or electrical conduit.

FIGS. 2 and 3 show a hole cutting assembly 30 having a hole saw 32 and a guide 34. The hole saw 32 has a saw cup 36 with a cylindrical side wall 38 extending from a central portion 40. The side wall 38 has a plurality of cutting teeth 42 disposed at the free end thereof. A guide drill bit 44 extends through the central portion 40 of the saw cup 36 with the shank portion 46 extending upwardly for attachment to a drill chuck (not shown) and the drill tip 48 extending downwardly for drilling into the material into which a sawn hole is to be made. The drill bit 44 may be secured to the central portion 40 by welding or may be conjoined to the saw cup 36 via an arbor and threaded clamp nuts, as is conventional for hole saws. In general, an existing conventional hole saw may be utilized for the hole saw 32, in accordance with the present disclosure, so long as the dimensions thereof are compatible with the guide 34, as described further below. The side wall 38 may have reliefs 50 (shown by a dotted line) to promote cutting efficiency and the teeth 42 can have various shapes and patterns for cutting different types of materials, as is known in the art. Further, other known types of hole saws can be utilized, e.g., hole saws having a saw blade held in a place in a circular groove or one having one or more cutting blades or gouges radially spaced from the guide drill bit.

The guide 34 has a guide member, such as shaft 52 that has an internal bore 54 extending through at least a portion of the shaft 52. The shaft 52 may be externally threaded at one end 55 to receive nuts 56, 58 to retain a support member, such as plate 60 on the shaft 52 approximately perpendicular thereto. Alternatively, plate 60 may be retained on the shaft 52 by welding or by swaging the shaft 52 and/or the plate 60. An elastomeric layer or gasket 62 may be positioned against or adhered to one side of plate 60 to provide a slip resistant interface between the plate 60 and the object O, which will not scratch the finish of the object O as the guide 34 is positioned. A second support member, such as spanning web 64 may be retained on the shaft 52 at the end thereof 66 opposite to the plate 60. The shaft 52 may be externally threaded at the end 66, which extends through an aperture 68 in the spanning web 64. A wing nut 70 retains the spanning web 64 on the threaded shaft 52 and may be used to adjust the position of the spanning web 64 relative to the plate 60. The spanning web 64 has a plurality of radially extending arms 72, 74, 76, 78, i.e., at least two in number, but preferably three or more, extending from a central hub 80 for spanning a given pre-drilled hole. Each arm 72, 74, 76, 78 has a sloping stepped upper surface $72_S$, $74_S$, ($74_S$ not visible in FIGS. 2 and 3), $76_S$, $78_S$ with a plurality of small teeth/steps 73 that step down toward the distal tips $72_T$, $74_T$, $76_T$, $78_T$ of the arms 72, 74, 76, 78. As a result, the sloping upper surfaces $72_S$, $74_S$, $76_S$, $78_S$ cumulatively define an approximate cone shape.

In use, the shaft 52 with the plate 60 attached at one end is inserted into a pre-existing hole H in an object O that needs to be enlarged, with the plate 60 spanning the hole H in the object O on one side and the shaft 52 depending from the plate 60 and extending into and through the existing hole H. The threaded end 66 of the shaft 52 is then inserted through the aperture 68 in the spanning web 64 and wing nut 70 is screwed onto the threaded end 66, capturing the object O between the plate 60/elastomeric coating/gasket 62 and the spanning web 64. As the wing nut 70 is tightened, the spanning web 64 is urged towards the plate 60 and into contact with the peripheral edge of the pre-existing hole H in the object. As the spanning web 64 approaches the plate 60, the engagement of the cone shape of the sloping upper surfaces $72_S$-$78_S$ of the arms 72-78 with the periphery of the hole H draws the spanning web 64 and the threaded end 66 of the shaft 52 captured in aperture 68 towards the center of the hole H in the object O.

Upon feeling resistance to further tightening of the wing nut 70, the plate 60 may be repositioned interactively by the installer, who can sense if repositioning results in the loosening of the wing nut 70, such that it can be further tightened, which is then done. More particularly, positioning the shaft 52 coaxially in the pre-existing hole H results in the distance between the plate 60 and the spanning web 64 being minimized when the wing nut 70 is tightened. If the shaft 52 is cocked relative to the axis of the hole H, then the shaft is disposed at a hypotenuse relative to the coaxial path and is therefore of greater length. The guide 34 may be used to find the approximate coaxial position for the shaft by the foregoing process of tightening of the wing nut 70, attempted repositioning of the plate 60, retightening of the wing nut 70 if loosened, etc.

Alternatively, the spanning web 64 may be visually placed in the approximate coaxial position relative to the pre-existing hole H with the wing nut 70 simultaneously held against the spanning web 64 concentric with the aperture 68. The shaft 52 with attached plate 60 may then be inserted into the hole H through the aperture 68 and threaded into the wing nut 70, all the while preserving the approximately coaxial position of the spanning web 64 relative to the hole H until the plate 60 is tightened down against the object O. Final tightening can then be accomplished by further tightening of the wing nut 70.

The steps 73 on the arms 72-78 can perform two functions, viz., they can act as teeth that bite into the object O when the spanning web 64 is tightened down on the object O, preventing the spanning web 64 from moving relative to the object O when the hole saw is used. In addition, if the steps 73 are dimensioned at a large enough scale and each arm 72-78 has a substantially identical set of steps 73 of the same size and position, each set of similar steps corresponds to a virtual hole size into which that particular set of steps will insert. For example, the sixth step 73 up from the distal tips $72_T$-$78_T$ of each of the respective arms 72-78 may define a given hole size $H_1$, e.g., 2.5 inches. The set of steps 73 on arms 72-78 that are three up from the distal tips $72_T$-$78_T$ may represent a larger hole size $H_2$, e.g., 3.0 inches, etc. Assuming an object O with parallel upper and lower surfaces and a round, pre-existing hole extending through the object O in a direction perpendicular to the upper and lower surfaces, when the spanning web 64 is positioned coaxially in the hole H, the peripheral edge of the hole H will contact the same step 73 (e.g., the $3^{rd}$ or the $6^{th}$ step, etc.) on each of the arms 72-78, resulting in a shaft 52 position that is approximately coaxial with the hole H. This is due in part to the symmetry of the spanning web 64 and to the fact that the aperture 68 extends perpendicularly to the radial extent of the spanning web 64 and preferably approximates the outside diameter of shaft 52, such that positioning the spanning web 64 in an orientation parallel to the upper or lower surface of the object O results in the aperture 68 holding the shaft 52 perpendicular thereto when the shaft 52 is inserted into the aperture 68.

Given that the foregoing process of positioning the guide 34 in a pre-existing hole H has been accomplished, resulting in the shaft 52 being approximately coaxially positioned in the hole H, with the wing nut 70 tight and the spanning web 64 and the plate 60 tightly clamping the object O on either side, the guide drill bit 44 of the hole saw 32 may be introduced into the internal bore 54 of the shaft 52. Given this mechanical cooperation, it is preferred that the bore 54 and the guide bit 44 are sized to establish a slip fit. Preferably, the material composition of the guide bit 44 and the shaft 52 are selected such that there is a workable degree of frictional interaction, with less being better than more. While a guide bit 44 in the form of a conventional twist drill is shown (that would be used on a conventional hole saw), a plain shaft without cutting edges could also be used in place of the drill guide bit 44, because the guide bit 44 is not used to drill through the object O, but is instead used simply to insert into and rotate within the bore 54 of the shaft 52. Once the guide bit 44 is positioned in the bore 54, the drill (not shown) may be activated to turn the hole saw 32. As the hole saw 32 rotates and engages the object O to cut an enlarged hole, the guide bit 44 is held on a rotational center by its engagement with the bore 54 of the shaft 52. Given a suitably sized guide bit 44, a conventional hole saw may be used in conjunction with the guide 34 as described herein.

As noted above, the teeth 73 either insert within the pre-existing hole H establishing a mechanical registration and/or grip/bite into the peripheral edge of the hole H to provide a rigid mounting of the guide 34 within the pre-existing hole H. This rigidity resists the forces applied to the shaft 52 by the guide bit 44 as the hole saw 32 encounters (digs into) the object O, the teeth 42 having a varying bite depending upon small variations of force on the hole saw 32 that push the hole saw 32 into the object O and upon variations in the angular orientation of the saw 32 due to the operator twisting the drill from side to side. The resilient layer/gasket 62 on the plate 60 also aids in retaining the shaft 52 in a single orientation in that it deforms and grips the surface of the object O.

In the event that a pre-existing hole H requires enlargement, but it is preferred that the enlarged hole be eccentric relative to the pre-existing hole (rather than coaxial), the hole cutting assembly 30 can be used in the same manner as described above, but with the spanning web 64 inverted, such that the flat surfaces $72_F$-$78_F$ of the arms 72-78 is positioned upwardly to contact the object O. The position of the desired enlarged hole may be determined by placing the plate 60 in the desired position (which may have been previously marked with a pencil) with the shaft 52 depending there from and extending into the hole H. The spanning web 64 is then slipped on the shaft 52 and the wing nut 70 threaded on and tightened, all the while holding the plate 60 to prevent movement of the plate 60 while tightening. Since the surfaces 72F-78F are flat, the spanning web 64 does not pull the shaft 52 towards the center of the hole H, but leaves the shaft 52 in the position in which it was originally placed. Once the guide 34 is positioned within the pre-existing hole H at the desired position, hole cutting can be conducted as before.

It will be understood that the embodiments described herein are merely exemplary and that a person skilled in the art may make many variations and modifications without departing from the spirit and scope of the claimed subject matter. All such variations and modifications are intended to be included within the scope of the appended claims.

We claim:

1. A guide for a hole saw having a pilot member and a cutting member for cutting a second hole in an object having a pre-existing hole, the second hole at least partially overlapping the pre-existing hole, comprising:

a guide member having a bore therein, the guide member capable of being positioned in the pre-existing hole and held in the pre-existing hole by at least a first support member attached to the guide member, the bore adapted to slideably receive the pilot member to guide the hole saw to rotate coaxially relative to the bore when cutting the second hole, the first support member having a component of extension perpendicular to the axis of the bore of the guide member;

a second support member having a component of extension perpendicular to the axis of the bore of the guide member, removably attachable to the guide member, the first and second support members capable of at least partially bridging the pre-existing hole when the guide member is positioned in the pre-existing hole with the first and second support members attached, the second support member having a plurality of radial arms extending from a hub and wherein the guide member is attached to the second support member proximate the hub, the hub having a first side and a second side, the first side disposed towards one end of the guide member and the second side disposed toward the other end of the guide member when attached thereto, a diameter of the hub being less than a diameter of the pre-existing hole, the radial arms tapering in thickness in a direction parallel to the direction of extension of the hub from the first side to the second side and having a greater thickness proximate the hub and a lesser thickness distal to the hub.

2. The guide of claim 1, wherein at least one of the first support member and the second support member is held in association with the guide member by an adjustable fastener that is adapted to selectively move one of the first and second support members to within a selected proximity of the other.

3. The guide of claim 2, wherein the tapering radial arms are capable of guiding the hub of the second support member toward a position proximate an axis of the pre-existing hole when the adjustable fastener moves the first and second support members closer together and the tapering radial arms contact the object proximate the pre-existing hole.

4. The guide of claim 3, wherein the tapering radial arms define sloped surfaces which cumulatively approximate a portion of a cone adapted to be selectively pointed toward the first support member, the cone progressively wedging into the pre-existing hole as the adjustable fastener urges the first and second support members closer together.

5. The guide of claim 4, wherein the tapering radial arms each have a plurality of steps on the sloped surfaces thereof defining a set of steps on each of the plurality of tapering radial arms.

6. The guide of claim 5, wherein the plurality of tapering radial arms are symmetrical about an axis through the hub, the set of steps on each of the plurality of tapering arms being approximately identical.

7. The guide of claim 6, wherein the steps approximate a plurality of concentric ledges of different radii.

8. The guide of claim 5, wherein the steps function as gripping teeth that bite into the object when the adjustable fastener is tightened.

9. The guide of claim 4, wherein the guide member has a threaded end, the threaded end extending through an aperture in the hub, the fastener being a nut that engages the threaded end and the first and second support members adapted to clamp the object there between when the fastener is tightened.

10. The guide of claim 9, further comprising a resilient member positioned adjacent to the first support member and between the first and second support members.

11. The guide of claim 10, wherein the first support is a disk attached to the guide member proximate one end and the guide member is tubular.

12. The guide of claim 11, wherein the second support member has four radial arms symmetrically disposed about an axis through the hub, the set of steps on each of the plurality of tapering arms being approximately identical.

13. A hole cutting assembly for cutting a second hole in an object having a pre-existing hole, the second hole at least partially overlapping the pre-existing hole, comprising:

a hole saw having a pilot member and a cutting member;

a guide tube having a bore therein and being threaded at at least one end;

a first support member in the form of a disk attached to the guide tube proximate one end at an approximately perpendicular relative orientation;

a second support member having a hub and a plurality of radial arms extending from the hub and attached to the guide tube proximate the hub, the hub having a first side and a second side and an axial aperture running from the first side to the second side of the hub, the axial aperture receiving the guide tube, the first side of the hub disposed towards one end of the guide tube and the second side disposed toward the other end of the guide tube when the guide tube is extended there through, the radial arms tapering in thickness in a direction parallel to the direction of extension of the hub from the first side to the second side and having a greater thickness proximate the hub and a lesser thickness distal to the hub;

a threaded fastener receivable on the threaded end of the guide tube to retain the second support member on the guide tube and to control the position of the second support member on the guide tube relative to the first support member, the first support member being positionable on one side of the object with the guide tube attached and extending through the pre-existing hole and the second support member being attached to the guide tube by the threaded fastener on the other side of the object, the tapering radial arms defining sloped surfaces which cumulatively approximate a portion of a virtual cone, such that when the guide tube is positioned in the pre-existing hole with the virtual cone pointed toward the first support member, the virtual cone progressively wedges into the pre-existing hole as the adjustable fastener urges the first and second support members closer together, moving the guide tube toward the axis of the pre-existing hole and holding the guide tube at a given position relative to the axis of the pre-existing hole, the bore of the guide tube adapted to slideably receive the pilot member to guide the hole saw to rotate coaxially relative to the bore when cutting the second hole.

14. The guide of claim 13, wherein said tapering radial arms each have a plurality of steps on the sloped surfaces thereof capable of functioning as gripping teeth that bite into the object when the adjustable fastener is tightened.

15. The guide of claim 14, wherein the second support member has four radial arms symmetrically disposed about an axis through the hub.

* * * * *